United States Patent
Peddamallu et al.

(10) Patent No.: US 10,496,443 B2
(45) Date of Patent: Dec. 3, 2019

(54) OS/HYPERVISOR-BASED PERSISTENT MEMORY

(71) Applicant: VMware, Inc., Palo Alto, CA (US)

(72) Inventors: Venkata Subhash Reddy Peddamallu, Sunnyvale, CA (US); Kiran Tati, Santa Clara, CA (US); Rajesh Venkatasubramanian, San Jose, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 1 day.

(21) Appl. No.: 15/586,109

(22) Filed: May 3, 2017

(65) Prior Publication Data
US 2018/0321962 A1    Nov. 8, 2018

(51) Int. Cl.
| | |
|---|---|
| *G06F 9/455* | (2018.01) |
| *G06F 3/06* | (2006.01) |
| *G06F 9/50* | (2006.01) |
| *G06F 12/16* | (2006.01) |
| *G06F 11/07* | (2006.01) |

(52) U.S. Cl.
CPC ........ *G06F 9/5016* (2013.01); *G06F 9/45533* (2013.01); *G06F 11/07* (2013.01); *G06F 12/16* (2013.01); *G06F 3/0604* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 6,901,298 B1* | 5/2005 | Govindaraj | G05B 19/058 700/21 |
| 7,720,806 B2* | 5/2010 | Piedmonte | G06F 16/2453 707/719 |
| 7,971,081 B2* | 6/2011 | Cooper | G06F 1/3203 365/228 |
| 8,826,273 B1* | 9/2014 | Chen | G06F 9/45558 718/1 |

(Continued)

FOREIGN PATENT DOCUMENTS

WO    WO-2016122471 A1 *   8/2016       G06F 12/16

OTHER PUBLICATIONS

J. Zhao, O. Mutlu, and Y. Xie. Firm: Fair and High-Performance Memory Control for Persistent Memory Systems. In International Symposium on Microarchitecture, 2014.

(Continued)

*Primary Examiner* — Abu Zar Ghaffari

(57) ABSTRACT

Techniques for implementing OS/hypervisor-based persistent memory are provided. In one embodiment, an OS or hypervisor running on a computer system can allocate a portion of the volatile memory of the computer system as a persistent memory allocation. The OS/hypervisor can further receive a signal from the computer system's BIOS indicating an AC power loss or cycle event and, in response to the signal, can save data in the persistent memory allocation to a nonvolatile backing store. Then, upon restoration of AC power to the computer system, the OS/hypervisor can restore the saved data from the nonvolatile backing store to the persistent memory allocation.

21 Claims, 5 Drawing Sheets

(56) References Cited

U.S. PATENT DOCUMENTS

| | | | |
|---|---|---|---|
| 8,943,498 B2* | 1/2015 | Frank | G06F 9/45558 718/1 |
| 9,164,856 B2 | 10/2015 | Harpaz et al. | |
| 9,231,923 B1* | 1/2016 | Cignetti | H04L 63/0428 |
| 9,280,467 B1* | 3/2016 | Kanteti | G06F 12/0808 |
| 9,342,423 B2* | 5/2016 | Judd | G06F 11/2284 |
| 9,645,901 B2 | 5/2017 | Nagaraj | |
| 9,703,706 B2* | 7/2017 | Bagal | G06F 12/0811 |
| 9,940,149 B2* | 4/2018 | Mathews | G06F 16/955 |
| 9,946,610 B2* | 4/2018 | Kinoshita | G06F 11/1666 |
| 9,996,291 B1* | 6/2018 | Izhar | G06F 3/0625 |
| 10,042,651 B2* | 8/2018 | Kirvan | G06F 9/4416 |
| 10,095,438 B2* | 10/2018 | Berke | G06F 3/0619 |
| 2004/0215911 A1* | 10/2004 | Ouren | G06F 9/4418 711/170 |
| 2005/0132150 A1* | 6/2005 | Jewell | G06F 3/0619 711/154 |
| 2011/0202728 A1* | 8/2011 | Nichols | G06F 9/461 711/141 |
| 2012/0137289 A1* | 5/2012 | Nolterieke | G06F 9/45558 718/1 |
| 2012/0254864 A1* | 10/2012 | Bork | G06F 9/45558 718/1 |
| 2014/0189198 A1* | 7/2014 | Siddiqi | G06F 12/0246 711/103 |
| 2014/0195480 A1* | 7/2014 | Talagala | G06F 12/0804 707/610 |
| 2014/0365707 A1* | 12/2014 | Talagala | G06F 12/0246 710/308 |
| 2015/0039815 A1* | 2/2015 | Klein | G06F 12/0246 711/103 |
| 2016/0098338 A1* | 4/2016 | Khatri | G06F 11/301 718/1 |
| 2016/0378623 A1* | 12/2016 | Kumar | G06F 3/0685 714/3 |
| 2017/0060697 A1* | 3/2017 | Berke | G06F 3/0619 |
| 2017/0212573 A1* | 7/2017 | Kelly | G06F 1/28 |
| 2018/0004561 A1* | 1/2018 | Liguori | G06F 9/5077 |
| 2018/0074968 A1 | 3/2018 | Bk et al. | |
| 2018/0095879 A1 | 4/2018 | Han et al. | |
| 2018/0107596 A1 | 4/2018 | Kelly et al. | |
| 2018/0239725 A1 | 8/2018 | Kumar et al. | |

OTHER PUBLICATIONS

HammerDB benchmark. hammerdb.coml. Site updated Apr. 2018.
HPE scalable persistent memory. hpe.com/us/en/servers/persistent-memory.html. Uploaded Aug. 17, 2018.
Intel Xeon processor E7 family: Reliability, availability, and serviceability. intel.com/content/www/us/en/processors/xeon/xeon-e7-family-ras-server-paper.html. Copyright 2011.
Micron NVDIMMs: Persistent memory performance. micron.com/~/media/documents/products/product-flyer/nvdimm/_flyer.pdf. 2016.
Persistent memory programming. pmem.io/. Dec. 2017.
NVM programming model (NPM). snia.org/tech\_activities/standards/curr\_standards/npm. Dec. 2013.
Sysbench benchmark. github.com/akoptytov/sysbench. Copyright 2018.
Magic quadrant for x86 server virtualization infrastructure. gartner.com/doc/2788024/magic-quadrant-x-server-virtualization, Jul. 2014 (republished Aug. 2016).
Intel and Micron Produce Breakthrough Memory Technology. New Class of Memory Unleashes the Performance of PCs, Data Centers and More. files.shareholder.com/downloads/ABEA-45YXOQ/5284651856x0x841530/7852AA28-4E57-4D8F-A180-FA135F0BC406/Micron-Intel\_Next\_Ger\_NVM\_Press\_Release\_FINAL\_072815.pdf. 2015.
J. Arulraj, A. Pavlo, and S. R. Dulloor. Let's talk about storage & recovery methods for non-volatile memory database systems. In International Conference on Management of Data, pp. 707-722, 2015.
E. Berg and E. Hagersten. StatCache: A probabilistic approach to efficient and accurate data locality analysis. In International Symposium on Performance Analysis of Systems and Software, pp. 20-27, Mar. 2004.
K. Bhandari, D. R. Chakrabarti, and H.-J. Boehm. Makalu: Fast recoverable allocation of non-volatile memory. In Objectoriented Programming, Systems, Languages, and Applications, pp. 677-694, 2016.
H.-J. Boehm and D. R. Chakrabarti. Persistence programming models for non-volatile memory. In International Symposium on Memory Management, pp. 55-67, 2016.
D. R. Chakrabarti, H.-J. Boehm, and K. Bhandari. Atlas: Leveraging locks for non-volatile memory consistency. In Object-oriented Programming, Systems, Languages, and Applications, 2014.
J. Coburn, A. M. Caulfield, A. Akel, L. M. Grupp, R. K. Gupta, R. Jhala, and S. Swanson. Nv-heaps: Making persistent objects fast and safe with next-generation, non-volatile memories. In International Conference on Architectural Support for Programming Languages and Operating Systems, 2011.
Doug Voigt. RDMA requirements for high availability in the NVM programming model. snia.org/sites/default/files/DougVoigt_RDMA_Requirements_for_HA.pdf. Storagae Developer Conference, Santa Clara, 2016.
A. Dragojevrc, D. Narayanan, O. Hodson, and M. Castro. FaRM: Fast remote memory. In Symposium on Networked Systems Design and Implementation, pp. 401-414, 2014.
A. Dragojevrc, D. Narayanan, E. B. Nightingale, M. Renzelmann, A. Shamis, A. Badam, and M. Castro. No compromises: Distributed transactions with consistency, availability, and performance. In ACM Symposium on Operating Systems Principles, pp. 54-70, 2015.
M. Friedman, M. Herlihy, V. Marathe, and E. Petrank. Brief Announcement: A Persistent Lock-Free Queue for Non-Volatile Memory. In International Symposium on Distributed Computing, vol. 91, pp. 50:1-50:4, 2017.
Intel. 3D XPointTM Unveiled—The Next Breakthrough in Memory Technology. intel.com/content/www/us/en/architecture-and-technology/3d-xpoint-unveiled-video.html.
Intel. Intel architecture instruction set extensions programming reference. software.intel.com/sites/default/files/managed/69/78/319433-025.pdf, pp. 24-104, Jul. 2012.
Viyojit: Decoupling battery and DRAM capacities for batterybacked DRAM. In International Symposium on Computer Architecture, pp. 613-626, Jun. 2017.
A. Kolli, S. Pelley, A. Saidi, P. M. Chen, and T. F. Wenisch. High-performance transactions for persistent memories. In International Conference on Architectural Support for Programming Languages and Operating Systems, pp. 399-411, 2016.
A. Kolli, J. Rosen, S. Diestelhorst, A. G. Saidi, S. Pelley, S. Liu, P. M. Chen, and T. F. Wenisch. Delegated persist ordering. In International Symposium on Microarchitecture, pp. 1-13, 2016.
A. Kolli, V. Gogte, A. G. Saidi, S. Diestelhorst, P. M. Chen, S. Narayanasamy, and T. F. Wenisch. Language-level persistency. In International Symposium on Computer Architecture, pp. 481-493, 2017.
E. Kultursay, M. Kandemir, A. Sivasubramaniam, and O. Mutlu. Evaluating STT-RAM as an energy-efficient main memory alternative. In International Symposium on Performance Analysis of Systems and Software, 2013.
S. Lai. Current status of the phase change memory and its future. In International Electron Devices Meeting, 2003.
B. C. Lee, E. Ipek, O. Mutlu, and D. Burger. Architecting Phase Change Memory As a Scalable DRAM Alternative. In International Symposium on Computer Architecture, 2009.
Left blank intentionally.
B. C. Lee, P. Zhou, J. Yang, Y. Zhang, B. Zhao, E. Ipek, O. Mutlu, and D. Burger. Phase Change Technology and the Future of Main Memory. International Symposium on Microarchitecture, 2010.
V. J. Marathe, M. Seltzer, S. Byan, and T. Harris. Persistent memcached: Bringing legacy code to byte-addressable persistent memory. In USENIX Workshop on Hot Topics in Storage, Santa Clara, CA, 2017.

(56) References Cited

OTHER PUBLICATIONS

I. Moraru, D. G. Andersen, M. Kaminsky, N. Tolia, P. Ranganathan, and N. Binkert. Consistent, durable, and safe memory management for byte-addressable non volatile main memory. In SIGOPS Conference on Timely Results in Operating Systems, 2013.
S. Nalli, S. Haria, M. D. Hill, M. M. Swift, H. Volos, and K. Keeton. An analysis of persistent memory use with whisper. In International Conference on Architectural Support for Programming Languages and Operating Systems, pp. 135-148, 2017.
D. Narayanan and O. Hodson. Whole-system Persistence. In International Conference on Architectural Support for Programming Languages and Operating Systems, pp. 401-410, New York, NY, USA, 2012.
F. Nawab, J. Izraelevitz, T. Kelly, C. B. M. III, D. R. Chakrabarti, and M. L Scott. Dali: A Periodically Persistent Hash Map. In International Symposium on Distributed Computing, vol. 91, pp. 37:1-37:16, 2017.
S. Pelley, P. M. Chen, and T. F.Wenisch. Memory Persistency. In International Symposium on Computer Architecture, 2014.
J. Ren, J. Zhao, S. Khan, J. Choi, Y. Wu, and O. Mutlu. ThyNVM: Enabling software-transparent crash consistency in persistent memory systems. In International Symposium on Microarchitecture, 2015.
Rob Davis, Chet Douglas, Paul Grun, Tom Talpey. Persistent memory over fabrics. flashmemorysummit.com/English/Collaterals/Proceedings/2017/20170809_FR22_Davis.pdf. 2017.
Y. Shan, S. Tsai, and Y. Zhang. Distributed shared persistent memory. In ACM Symposium on Cloud Computing, pp. 323-337, 2017.
D. B. Strukov, G. S. Snider, D. R. Stewart, and R. S.Williams. The missing memristor found. Nature, 2008.
A. S. Tanenbaum and H. Bos. Modem operating systems. Prentice Hall Press, 4th edition, 2014.
S. Venkataraman, N. Tolia, P. Ranganathan, and R. H. Campbell. Consistent and durable data structures for non-volatile byte-addressable memory. In USENIX Conference on File and Storage Technologies, 2011.
H. Volos, A. J. Tack, and M. M. Swift. Mnemosyne: Lightweight persistent memory. In International Conference on Architectural Support for Programming Languages and Operating Systems, 2011.
C. A. Waldspurger, N. Park, A. Garthwaite, and I. Ahmad. Efficient MRC construction with SHARDS. In USENIX conference on File and Storage Technologies, pp. 95-110, Feb. 2015.
J. Xu and S. Swanson. Nova: A log-structured file system for hybrid volatile/non-volatile main memories. In USENIX conference on File and Storage Technologies, pp. 323-338, 2016.
J. Xu, L. Zhang, A. Memaripour, A. Gangadharaiah, A. Borase, T. B. D. Silva, S. Swanson, and A. Rudoff. Novafortis: A fault-tolerant non-volatile main memory file system. In ACM Symposium on Operating Systems Principles, pp. 478-496, 2017.
Y. Zhang, J. Yang, A. Memaripour, and S. Swanson. Mojim: A reliable and highly-available non-volatile memory system. In International Conference on Architectural Support for Programming Languages and Operating Systems, pp. 3-18, 2015.

\* cited by examiner

OS/HYPERVISOR-BASED PERSISTENT MEMORY

CROSS-REFERENCES TO RELATED APPLICATIONS

The present application is related to commonly-owned U.S. patent application Ser. No. 15/586,020, filed concurrently herewith, entitled "High Availability For Persistent Memory." This related application is incorporated herein by reference in its entirety for all purposes.

BACKGROUND

Traditional computer systems include byte-addressable volatile memory (e.g., dynamic random access memory, or DRAM) and block-addressable nonvolatile storage devices such as solid state disks (SSDs) and magnetic disks. A typical program reads data from nonvolatile storage, stores and modifies the data in volatile memory, and then writes the modified data back to nonvolatile storage using block-based commands.

Persistent memory is an emerging technology that offers fast, byte-level access to data in a manner similar to DRAM, but is nonvolatile in nature. Thus, with persistent memory, software applications can access and modify individual bytes of data in-place using regular memory load and store instructions, and at the same time be assured that the data will be preserved in the memory and can continue to be accessed after, e.g., an AC (alternating current) power failure or other event that causes the system motherboard to lose or cycle AC power (e.g., a cold or hot reboot).

There are a number of implementations of persistent memory that are based on new physical memory types, such as phase-change memory (PCM) and magnetoresistive RAM. There is also an approach that implements persistent memory by combining DRAM, a battery, and nonvolatile memory (e.g., flash memory) on a custom dual-inline memory module (known as a non-volatile DIMM, or NVDIMM). With this approach, the system BIOS presents the DRAM on the NVDIMM as persistent memory to the computer system's operating system (OS) or hypervisor. This memory is not "true" persistent memory in the sense that the DRAM itself is still volatile. However, when an AC power loss event occurs, a specialized controller on the NVDIMM automatically saves the contents of the DRAM to the local flash memory while the NVDIMM is powered via the battery. Then, when AC power is restored and the system is powered on again, the controller reads the saved data from the flash memory back into the NVDIMM DRAM, thereby restoring the persistent memory for use by applications.

While NVDIMMs are a practical alternative to more exotic persistent memory designs, NVDIMMs are still quite expensive; for example, a NVDIMM module may cost twice as much as a regular DRAM module of similar density/capacity. Accordingly, it would be desirable to have techniques for implementing persistent memory that can leverage the existing components in current computer systems, without requiring custom hardware.

SUMMARY

Techniques for implementing OS/hypervisor-based persistent memory are provided. In one embodiment, an OS or hypervisor running on a computer system can allocate a portion of the volatile memory of the computer system as a persistent memory allocation. The OS/hypervisor can further receive a signal from the computer system's BIOS indicating an AC power loss or cycle event and, in response to the signal, can save data in the persistent memory allocation to a nonvolatile backing store. Then, upon restoration of AC power to the computer system, the OS/hypervisor can restore the saved data from the nonvolatile backing store to the persistent memory allocation.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques that enable an OS or hypervisor of a computer system to implement persistent memory using a battery, conventional DRAM, and a conventional nonvolatile storage or memory device (e.g., a solid-state disk (SSD)). These techniques are collectively referred to herein as "OS/hypervisor-based persistent memory." With OS/hypervisor-based persistent memory, the OS/hypervisor allocates and exposes a portion of DRAM as persistent memory to the system's applications. Then, when an AC power loss or power cycle event occurs, the OS/hypervisor detects this event (via, e.g., an interrupt received from the system BIOS) and automatically saves the contents of the persistent memory allocation in DRAM to the nonvolatile storage/memory device while the computer system continues to run on battery power. Further, when AC power is restored and the computer system is powered on again, the OS/hypervisor reads the saved data from the nonvolatile storage/memory device back into the persistent memory allocation in DRAM, thereby restoring the persistent memory for use by applications.

With the general approach described above, there is no need to procure and install custom memory modules (e.g., NVDIMMs or other persistent memory types) in order to provide persistent memory functionality, instead, persistent memory can be implemented using components that are typically found in existing computer systems. The only atypical hardware component that is needed for OS/hypervisor-based persistent memory is a battery (or other self-contained power source) that has sufficient capacity to power the computer system while the OS/hypervisor saves the persistent memory data in DRAM to the nonvolatile storage/memory.

Further, since the OS/hypervisor is aware of, and has flexible control over, how system memory is accessed by applications (e.g., which memory pages are modified, which memory pages are read, etc.), the OS/hypervisor can leverage this information and control to implement various optimizations/enhancements that, e.g., (1) reduce the time needed for saving and restoring, (2) increase the maximum size of persistent memory supported (for a given battery size), (3) increase the OS/hypervisor's choice in nonvolatile backing store, (4) enable the OS/hypervisor to dynamically change the size of the persistent memory allocation, and (5) enable the OS/hypervisor to gracefully deal with battery failures or problems.

The foregoing and other aspects of the present disclosure are described in further detail below.

2. Example Computer System and High-Level Workflow

Figure 1:
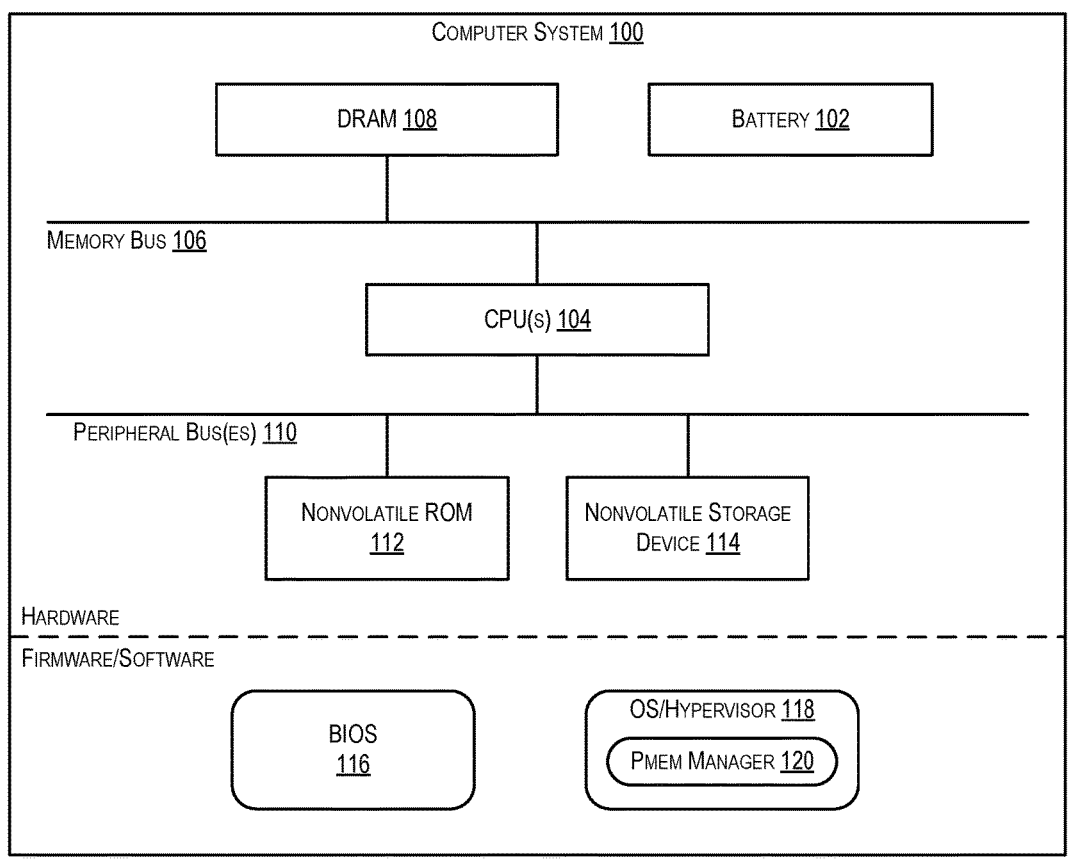
FIG. 1 depicts a computer system in which embodiments of the present disclosure may be implemented.

FIG. 1 is a simplified block diagram of a computer system 100 that may be used to implement embodiments of the present disclosure. On the hardware side, computer system 100 includes a battery 102 and one or more central processing units (CPUs) 104. CPU(s) 104 are connected, via a memory bus 106, to a byte-addressable volatile memory (i.e., DRAM) 108. CPU(s) 104 are also connected, via one or more peripheral buses 110, to a nonvolatile ROM (e.g., EEPROM or flash-based ROM) 112 and a block-addressable nonvolatile storage device 114. Nonvolatile storage device 114 may be, e.g., an NVM Express (NVMe)-based SSD, a magnetic hard disk, or any other type of storage device known in the art.

On the firmware/software side, computer system 100 includes a system BIOS 116, which may run from nonvolatile ROM 112, and an OS/hypervisor 118, which may run from DRAM 108. Although not shown, computer system 100 can also include one or more applications or virtual machines (VM) that run on top of OS/hypervisor 118.

As noted the Background section, persistent memory is an emerging memory technology that offers the dual advantages of (1) speed and read/write granularity that is similar to DRAM and (2) the ability persist its stored data across power cycles. However, existing implementations of persistent memory, such as phase-change memory, NVDIMMs, and the like are fairly costly to use/deploy on a large scale basis.

To address these and other similar issues, OS/hypervisor 118 of computer system 100 can be enhanced to include a novel persistent memory manager (pmem manager) 120 as shown in FIG. 1. In various embodiments, pmem manager 120 can enable computer system 100 to implement OS/hypervisor-based persistent memory—in other words, a persistent memory scheme in which OS/hypervisor 118 can allocate and expose a portion of DRAM 108 as persistent memory to applications. This gives the applications the illusion that the allocated portion is true persistent memory, when in fact it is volatile. In the case where an event occurs that causes computer system 100 (or more particularly, the motherboard of computer system 100) to lose or cycle AC power on a short or long term basis (e.g., an AC power failure, hot or cold reboot, etc.). pmem manager 120 can save the contents of the persistent memory allocation from DRAM 108 to storage device 114 (or some other nonvolatile storage or memory device) while computer system 100 continues to operate on power provided by battery 102. Then, when AC power is restored and computer system 100 is restarted, pmem manager 120 can execute a corresponding restore operation that moves the saved data back into the allocated portion of DRAM 108. In this way, pmem manager 120 can enable persistent memory functionality using conventional, off-the-shelf components.

Figure 2:
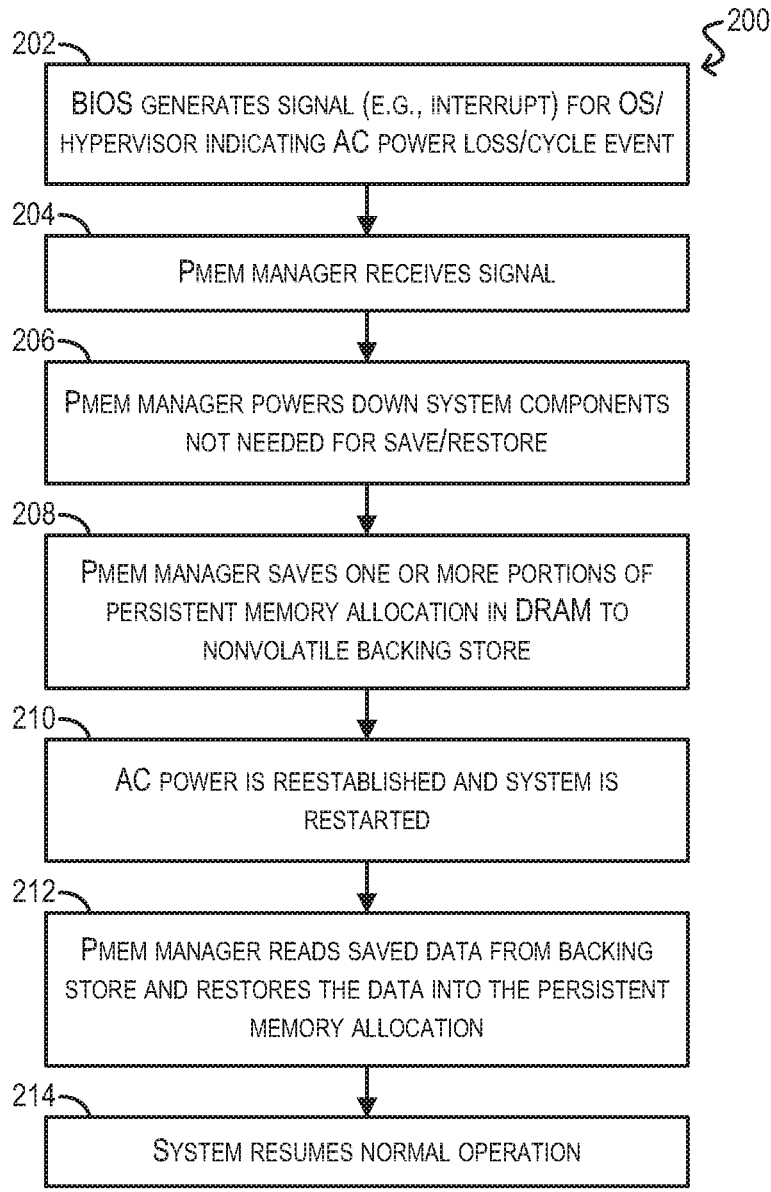
FIG. 2 depicts a high-level workflow for implementing OS/hypervisor-based persistent memory according to an embodiment.

FIG. 2 is a workflow 200 illustrating, at a high level, how pmem manager 120 may implement this save and restore process according to an embodiment.

Starting with block 202, at the time of an event that causes the motherboard of computer system 100 to lose or cycle AC power and thus potentially lose the contents of the persistent memory allocation in DRAM 108 (i.e., an "AC power loss event"), BIOS 116 can generate a signal, such as a high-priority interrupt, indicating the occurrence of the AC power loss/cycle event to OS/hypervisor 118. In certain embodiments, BIOS 116 can be specifically modified to generate this signal for OS/hypervisor 118. Concurrently with block 202, computer system 100 can switch over to being powered by battery 102.

At blocks 204 and 206, pmem manager 120 of OS/hypervisor 118 can receive the signal generated at block 202 and can power down components of computer system 100 that are not needed for the save and restore process (e.g., the system's graphics processing unit (GPU), powered peripheral ports, etc.). Pmem manager 120 can then write one or more portions of the persistent memory allocation from DRAM 108 to a nonvolatile backing store (e.g., storage device 114 or some other storage device), or some other location from which the one or more portions can be subsequently retrieved (e.g., some other system memory on computer system 100 or a different computer system) (block 208). In certain embodiments, as part of this step, pmem manager 120 may only write portions of the persistent memory allocation that have actually been modified during system runtime (explained in further detail below).

At some point, AC power will be reestablished and computer system 100 will be restarted (block 210). In response, pmem manager 120 can read the data saved at block 208 from the backing store and restore that data to the persistent memory allocation of DRAM 108 (block 212) (note that, in some embodiments, pmem manager 120 may not restore the entirety of the saved data at this point; this is discussed in Section (5) below). Finally, at block 214, computer system 100 can resume its normal operation and the applications/VMs of the system can continue accessing the data in the persistent memory allocation.

By orchestrating the save and restore process at the OS/hypervisor level as shown in FIG. 2 rather than on, e.g., an NVDIMM controller, OS-hypervisor-based persistent memory can allow computer system 100 to implement persistent memory without custom memory modules/hardware. At the same time, since OS/hypervisor 118 has inherent knowledge and control over how the persistent memory allocation is accessed during system runtime, OS/hypervisor-based persistent memory also implement certain optimizations and enhancements.

For example, as alluded to above, in one embodiment pmem manager 120 can leverage the OS/hypervisor's knowledge of which portions of the persistent memory allocation are modified by applications in order to save only those modified portions to disk, thereby reducing the system downtime needed for carrying out the save operation. In another embodiment, pmem manager 120 leverage the OS/hypervisor's knowledge of when applications issue memory read/write requests in order to restore the contents of the persistent memory allocation in a lazy fashion, thereby reducing or eliminating the system downtime needed for carrying out the restore operation. In yet other embodiments, pmem manager 120 can implement other features that facilitate, e.g., an increase in the maximum size of persistent memory supported (for a given battery size), an increase in choice of backing store, dynamic resizing of the persistent memory allocation, and graceful error/failure handling. Each of these optimizations and enhancements are described in further detail in the sections that follow.

It should be appreciated that high-level workflow 200 of FIG. 2 is illustrative and various modifications are possible. For example, although workflow 200 assumes that pmem manager 120 performs the save process in response to receiving a specific interrupt from BIOS 116 indicating that a power loss is imminent, in some embodiments a software failure may occur during runtime that causes the system CPUs to be restarted, without rebooting the entire system. In these causes, pmem manager 120 can detect this condition and, when the CPUs start up again, pmem manager 120 can save the contents of the persistent memory allocation before proceeding with its normal boot process. In these cases, BIOS 116 can be specifically configured to keep the contents of DRAM 108 intact while the CPUs are restarted (so that the persistent memory allocation can be saved).

3. Optimizing Save

Figure 3:
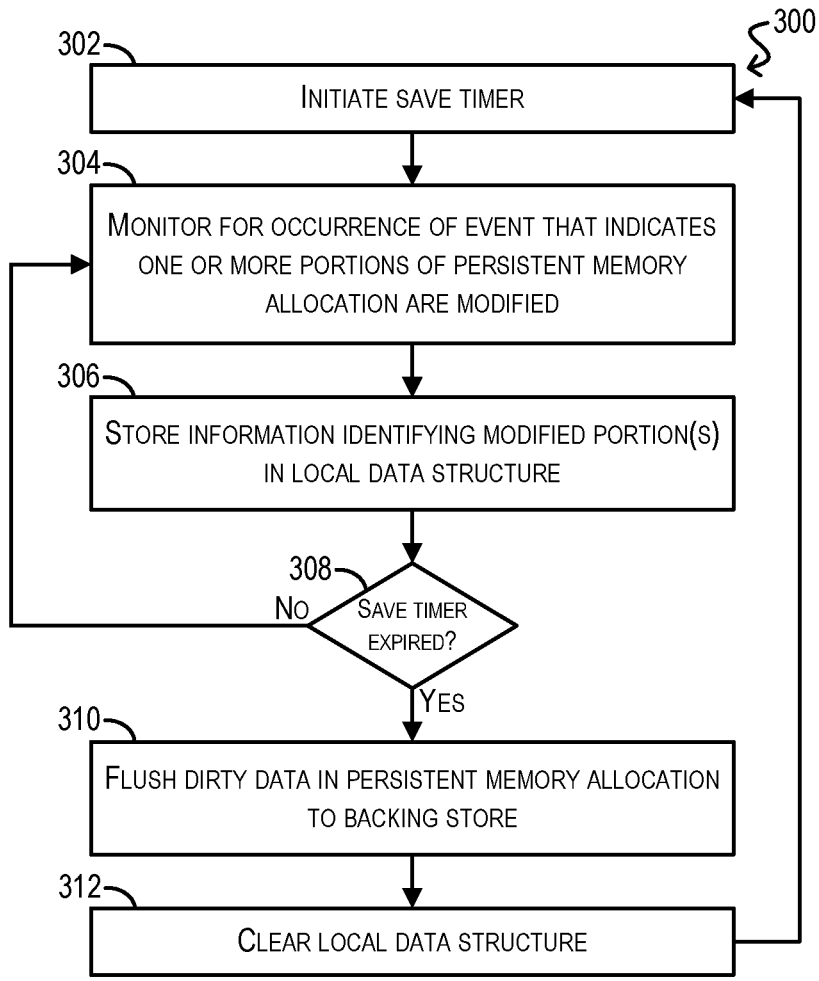
FIG. 3 depicts a workflow for optimizing the saving of persistent memory data according to an embodiment.

FIG. 3 depicts a workflow 300 that may be executed by pmem manager 120 for optimizing the save operation described at block 208 of FIG. 2 according to an embodiment. With this optimization, pmem manager 120 can track portions of the persistent memory allocation in DRAM 108 that are modified (i.e., dirtied) during system runtime, and can flush those modified portions to disk on a periodic basis. As a result, at the time of an AC power loss/cycle event, pmem manager 120 will only need to persist the portions of the persistent memory allocation that have been modified since the last flush operation, leading to less system downtime than embodiments where the entirety of the persistent memory allocation is saved.

Workflow 300 can be executed on a continuous basis while computer system 100 is running (i.e., before the occurrence of an AC power loss/cycle event per block 202 of workflow 200). At block 302, pmem manager 120 can first initiate a save timer that is configured to run for a predefined time interval (e.g., 1 minute, 5 minutes, etc.). This time interval may be set automatically by OS/hypervisor 118 or may be user-configurable.

At block 304, while the save timer is running, pmem manager 120 can monitor for the occurrence of an event that indicates one or more portions of the persistent memory allocation in DRAM 108 have been, or likely will be, modified. Upon detecting such an event, pmem manager 120 can identify the modified portion(s) and store information regarding these modified portion(s) in a local data structure (block 306).

The specific types of events that pmem manager 120 can look for at block 304 can differ depending upon the granularity at which pmem manager 120 is configured to track modifications to the persistent memory allocation. For example, in one set of embodiments, pmem manager 120 may be configured to track modifications at file granularity. In these embodiments, pmem manager 120 can monitor for a file open or modification event (by, e.g., communicating with the OS/hypervisor's file system layer) and, upon detecting such an event, can store an identifier of the opened/modified file in the local data structure. In another set of embodiments, pmem manager 120 may be configured to track modifications at memory page granularity. In these embodiments, pmem manager 120 can monitor for a memory page write (by, e.g., examining the dirty page bits in the OS/hypervisor's page tables) and can store an identifier of the dirty memory page in the local data structure.

At block 308, pmem manager 120 can check whether the save timer has expired. If not, pmem manager 120 can return to block 304 in order to monitor for further memory modification events.

If the save timer has expired at block 308, pmem manager 120 can flush (i.e., write) all of the dirty or potentially dirty data in the persistent memory allocation (as identified in the local data structure) to the nonvolatile backing store (block 310). Pmem manager 120 can then clear the local data structure (block 312) and return to block 302 in order to re-initialize the save timer and restart the entire process.

Finally, although not shown in FIG. 3, when an AC power loss event occurs, pmem manager 120 can save the current dirty data in the persistent memory allocation (rather than the entirety of the allocation) to the nonvolatile backing store. The total amount of this dirty data should be relatively small because pmem manager 120 will have already flushed the dirty data from previous time intervals, and thus the remaining dirty data will only comprise data modified in the most recent time interval. As a result, the time needed to complete the save operation can be substantially reduced.

4. Increasing Maximum Size of Persistent Memory

Generally speaking, the maximum amount of DRAM 108 than can be allocated and exposed as persistent memory is a function of (1) the capacity of battery 102 and (2) the write bandwidth of the nonvolatile backing store (e.g., nonvolatile storage device 114) to which the persistent memory data is saved. This is because pmem manager 120 needs to ensure that the entirety of the persistent memory allocation can be saved within the window of operational time afforded by battery 102, and thus the allocation size is limited to X times Y, where X is the amount of data per second that the nonvolatile backing store can write in a sustained manner (i.e., the device's sustained write bandwidth) and Y is the number of seconds the battery can keep the system running.

In certain embodiments, this cap on persistent memory size can be circumvented by building upon workflow 300 of FIG. 3 and limiting, by pmem manager 102 via a "dirty data limit," the amount of persistent memory that is allowed to be modified by applications/VMs before those modified memory portions are flushed to storage per block 310 of workflow 300. For example, assume this dirty data limit is set to 100 gigabytes (GBs). This means that pmem manager 120 will not allow more than 100 GBs of data in the persistent memory allocation to be dirty at any point in time, even though the total size of the persistent memory allocation may be significantly larger. As a result, battery 102 and the nonvolatile backing store only need to provide enough wattage and write bandwidth respectively to ensure that 100 GB of data can be written to disk at the time of an AC power loss event. This effectively removes the physical characteristics of the battery and the backing store as limiting factors on the persistent memory size.

Figure 4:
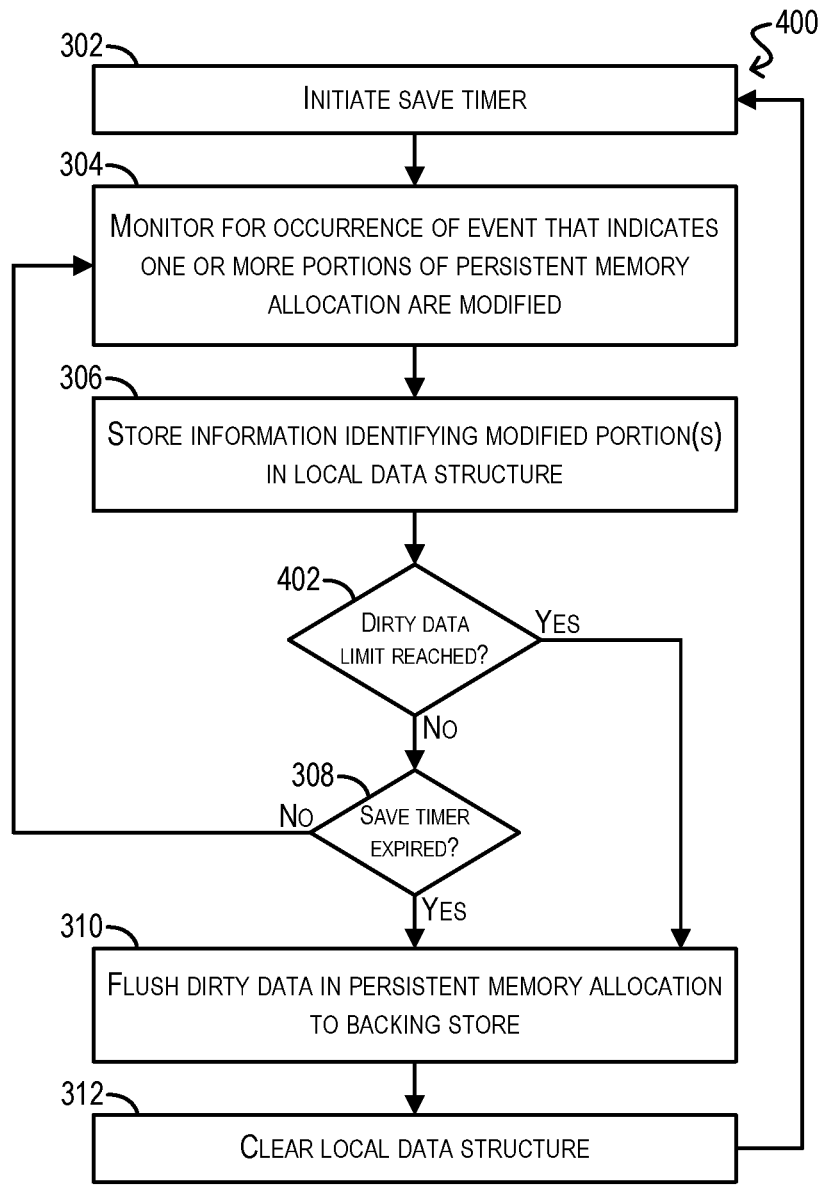
FIG. 4 depicts a workflow for implementing a dirty data limit within the workflow of FIG. 3 according to an embodiment.

FIG. 4 depicts a workflow 400 that can be executed by pmem manager 120 for implementing the dirty data limit according to an embodiment. Workflow 400 is similar to workflow 300 and is based on the same general principle of tracking portions of the persistent memory allocation that have been modified and flushing those modified portions to disk on a periodic basis. However, prior to checking whether the save timer has expired, pmem manager 102 can check whether the dirty data limit has been reached (block 402). If the dirty data limit has not been reached, pmem manager 102 can move on to checking the expiry of the save timer (block 308).

On the other hand, if the dirty data limit has been reached at block 402, pmem manager 120 can immediately proceed with flushing all of the dirty data in the persistent memory allocation (block 310). In this way, pmem manager 120 can ensure that the total amount of dirty data in the allocation does not exceed the limit. As part of this, pmem manager 120 can slow down or suspend running processes/threads until the flushing is complete in order to avoid any additional memory writes during this period.

5. Optimizing Restore

In addition to optimizing the saving of persistent memory data from DRAM to nonvolatile storage, in certain embodiments pmem manager 120 can also optimize the restoring of that data back into the persistent memory allocation in DRAM. This optimization is based on the observation that OS/hypervisor 118 knows (by virtue of its memory management responsibilities) which processes/threads issue memory access requests, and when those requests occur. Thus, pmem manager 120 does not need to restore all of the data from the backing store to DRAM immediately upon system bootup/initialization. Instead, pmem manager 120 can retrieve this data in a "lazy" manner while the system is running (i.e., on demand, in response to a particular memory access request).

Figure 5:
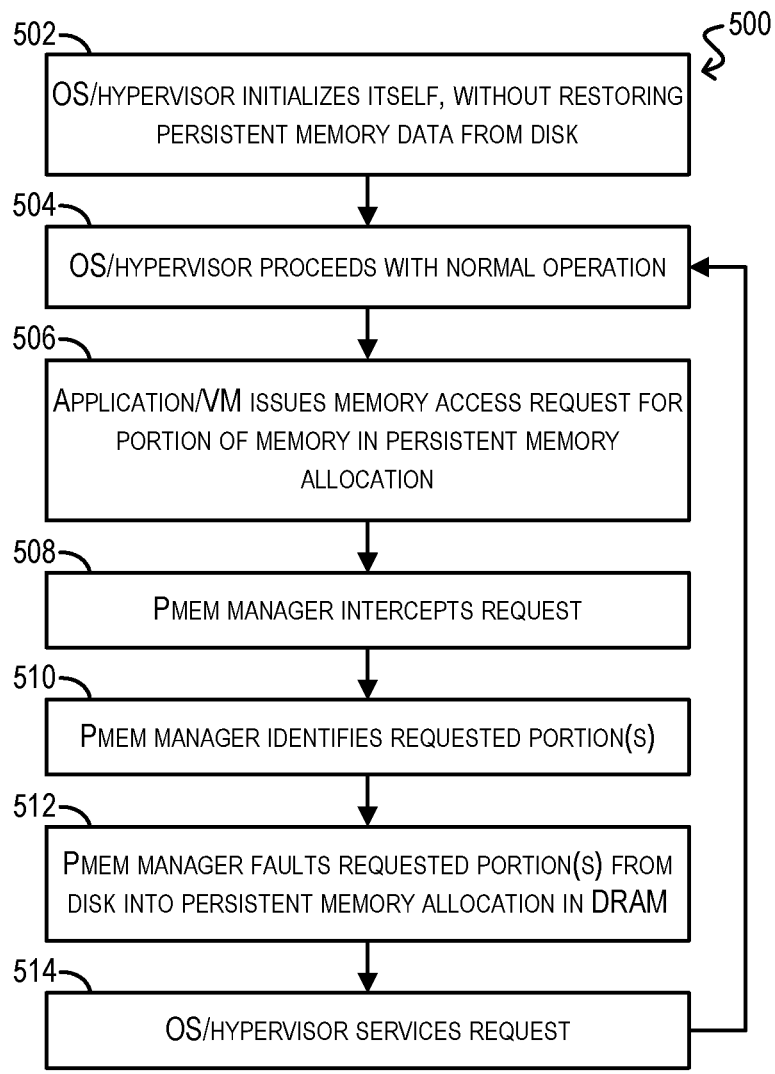
FIG. 5 depicts a workflow for optimizing the restoration of persistent memory data according to an embodiment.

FIG. 5 depicts a workflow 500 illustrating this optimized restore process according to an embodiment. Workflow 500 assumes that (1) an AC power loss/cycle event previously occurred that caused pmem manager 120 to save modified portions of the persistent memory allocation from DRAM 108 to disk, and (2) AC power has now been restored and the system is being restarted.

At block 502, as part of the system restart process, OS/hypervisor 118 can initialize itself. However, rather than restoring the persistent data from the backing store to DRAM at this point, the data can be kept on disk (OS/hypervisor 118 may only read a small amount of data from the backing store in order to mount the persistent memory allocation). OS/hypervisor 118 can then proceed with its normal runtime operation, which can include running one or more applications, VMs, and/or the like (block 504).

At block 506, an application or VM can issue a memory access request for a particular portion of memory (e.g., one or more memory pages) that resides in the persistent memory allocation. In response, pmem manager 120 can intercept the memory access request (block 508), identify the requested portion(s) (block 510), and restore (i.e., fault) those specific portion(s) from disk into DRAM (block 512). OS/hypervisor 118 can then continue with servicing the request (block 514), and this process can repeat until all of the persistent memory data is restored in DRAM. Beyond delaying the restore process, another advantage of this optimization is that the persistent memory allocation in DRAM is not used if none of the applications/VMs attempt to access the saved persistent memory data.

6. Increasing Choice of Backing Store

With NVDIMMs, the storage device to which persistent memory data can be saved to and restored from is limited to the dedicated flash memory that is resident on the NVDIMM module. The NVDIMM controller generally cannot save persistent memory data to storage/memory devices that are external to the NVDIMM and, even if the controller were configured to do in theory, the controller would be necessarily limited to using dedicated storage/memory devices can provide a consistent amount of write bandwidth throughout the save operation (because the controller must ensure that the entirety of the NVDIMM DRAM can be saved within the operational time afforded by the NVDIMM battery, and this cannot be enforced if consistent write bandwidth is not guaranteed.

With OS/hypervisor-based memory, pmem manager 120 has the ability to limit the amount of dirty data that is present in the persistent memory allocation via the "dirty data limit" parameter discussed in Section (4) above. In certain embodiments, pmem manager 120 can leverage this parameter to account for fluctuations in the write bandwidth of the backing store to which persistent memory data is saved. For example, assume that the typical sustained write bandwidth of the backing store is 3 GB per second, but the bandwidth fails to 1 GB per second for some reason (e.g., another storage client starts reading from or writing to the storage). In this scenario, pmem manager 120 can detect the drop in bandwidth and can dynamically reduce the value of the dirty data limit so that the total amount of dirty data does not exceed what can be written to the backing store using this reduced bandwidth figure (and given the battery size). Once the write bandwidth returns to the typical 3 GB per second, pmem manager 120 can increase the dirty data limit back to its original value.

The foregoing technique of dynamically modifying the dirty data limit means that the OS/hypervisor 118 can have a greater choice in backing store, since bandwidth changes will no longer cause an issue in writing all of the dirty data in the persistent memory allocation to disk. Thus, OS/hypervisor 118 can potentially choose a shared storage device for this purpose (e.g., a dual ported device, a networked array, etc.).

7. Handling Battery Issues

In addition to using the dirty data limit parameter to increase choice in backing store, pmem manager 120 can also leverage this parameter to handle certain issues that may arise with battery 102 in an intelligent manner.

For instance, assume battery 102 reaches near the end of its lifecycle and is only capable of charging to 50% of its rated capacity. In this case, pmem manager 120 can detect this reduced maximum charge level and can automatically adjust the dirty data limit downward to ensure that all dirty data in the persistent memory allocation can be successfully written to disk in the case of a failure (i.e., within the operational time afforded by the battery).

Further, if the battery suddenly loses its charge due to a failure (e.g., goes from 50% charge to near-zero charge instantly), pmem manager 120 can also detect this failure and immediately flush the dirty data from DRAM 108 to disk.

Yet further, if there is a failure with the nonvolatile backing store, pmem manager 120 can dynamically choose another backing store (either on the same system or a remote machine) and switch over to using that new backing store.

8. Dynamically Resizing the Persistent Memory Allocation

With NVDIMMs, the amount of persistent memory supported is generally fixed to equal the size of the NVDIMM DRAM modules.

With OS/hypervisor-based persistent memory, it is possible for pmem manager 120 to dynamically change the size of the persistent memory allocation (as, e.g., a percentage of total physical DRAM) during system runtime. Stated another way, pmem manager 120 can fluidly convert persistent memory to volatile memory (and vice versa) based on the needs of the applications running on the system, rather than being limited to a static allocation as in the case of NVDIMMs. In one set of embodiments, pmem manager 120 can accomplish this by maintaining a data structure identifying the specific memory pages (or memory address ranges) that are part of the persistent memory allocation and updating this data structure as the size of the allocation is increased or reduced. Pmem manager 120 can then reference this data structure during the save and restore process to write out, and read back in, only those memory pages that are deemed to be persistent.

This resizing capability can be useful in a number of different scenarios where the memory requirements of the applications or VMs running on the system may evolve over time. For example, consider a situation where ten VMs are active and another five VMs need to be started (each requiring X GBs of volatile memory). In this case, an appropriate amount of persistent memory may be dynamically converted to volatile memory in order meet the requirements of the new VMs.

As another example, consider a scenario where the persistent memory allocation of a first computer system needs to be restored on a second computer system for high availability purposes, but the second computer system does not have sufficient persistent memory to perform the restore. In this case, an appropriate amount of volatile memory on the second computer system can be dynamically converted to persistent memory in order to carry out the restore process.

9. Exposing More Persistent Memory than Available DRAM

With NVDIMMs, the size of the persistent memory allocation cannot exceed the total amount of physical DRAM on the NVDIMM module. On the other hand, with OS/hypervisor-based persistent memory, pmem manager 120 can leverage the OS/hypervisor's virtual memory capabilities in order to allocate and expose a persistent memory space that is larger than the system's physical memory space.

For example, assume the total amount of DRAM 108 in computer system 100 of FIG. 1 is 128 GBs. In this case, pmem manager 120 may expose a "virtual" persistent memory address space to applications/VMs that is, e.g., 192 GBs in size. A portion of the virtual persistent memory pages may reside in DRAM, and a portion may reside on nonvolatile storage. When a request is received to read or write a persistent memory page that is not in DRAM, pmem manager 129 can swap in that page from disk to DRAM in order to service the request, in a manner similar to conventional virtual memory paging.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing operating system (OS) or hypervisor-based persistent memory, the method comprising:

allocating, by an OS or a hypervisor running on a computer system, a portion of a memory space of a volatile memory of the computer system as a persistent memory allocation;

receiving, by the OS or the hypervisor, a signal from a BIOS (Basic Input/Output System) of the computer system indicating an alternating current (AC) power loss or power cycle event;

in response to the signal, saving, by the OS or the hypervisor, data in the persistent memory allocation to a nonvolatile storage device; and upon restoration of AC power to the computer system, restoring, by the OS or the hypervisor, the saved data from the nonvolatile storage device to the persistent memory allocation.

2. The method of claim 1 further comprising, prior to receiving the signal:
tracking one or more memory pages in the persistent memory allocation that are written to or likely to be written to during runtime of the computer system; and
periodically flushing dirty data in the one or more memory pages to the nonvolatile storage device while the computer system is running on AC power,
wherein the data saved in response to the signal corresponds to a part of the dirty data in the one or more memory pages that has not yet been flushed via the periodic flushing.

3. The method of claim 2 wherein the OS or hypervisor ensures that an amount of the data in the persistent memory allocation that has not been flushed to the nonvolatile storage device does not exceed a threshold.

4. The method of claim 3 wherein the threshold is dynamically increased or decreased during the runtime of the computer system in response to a change in write bandwidth of the nonvolatile storage device.

5. The method of claim 3 wherein the threshold is dynamically increased or decreased during the runtime of the computer system in response to a change in charge capacity or charge level of a battery of the computer system.

6. The method of claim 1 wherein the restoring comprises:
intercepting a memory access request directed to a particular portion of the saved data; and
in response to the intercepting, restoring the particular portion from the nonvolatile storage device to the persistent memory allocation.

7. The method of claim 1 further comprising:
dynamically modifying the persistent memory allocation's size during runtime of the computer system.

8. A non-transitory computer readable storage medium having stored thereon program code executable by an operating system (OS) or hypervisor running on a computer system, the program code embodying a method for implementing OS or hypervisor-based persistent memory, the method comprising:
allocating a portion of a memory space of a volatile memory of the computer system as a persistent memory allocation;
receiving a signal from a BIOS (Basic Input/Output System) of the computer system indicating an alternating current (AC) power loss or power cycle event;
in response to the signal, saving data in the persistent memory allocation to a nonvolatile storage device; and
upon restoration of AC power to the computer system, restoring the saved data from the nonvolatile storage device to the persistent memory allocation.

9. The non-transitory computer readable storage medium of claim 8 wherein the method further comprises, prior to receiving the signal:
tracking one or more memory pages in the persistent memory allocation that are written to or likely to be written to during runtime of the computer system; and
periodically flushing dirty data the one or more memory pages to the nonvolatile storage device while the computer system is running on AC power,
wherein the data saved in response to the signal corresponds to a part of the dirty data in the one or more memory pages that has not yet been flushed via the periodic flushing.

10. The non-transitory computer readable storage medium of claim 9 wherein the OS or hypervisor ensures that an amount of the data in the persistent memory allocation that has not been flushed to the nonvolatile storage device does not exceed a threshold.

11. The non-transitory computer readable storage medium of claim 10 wherein the threshold is dynamically increased or decreased during the runtime of the computer system in response to a change in write bandwidth of the nonvolatile storage device.

12. The non-transitory computer readable storage medium of claim 10 wherein the threshold is dynamically increased or decreased during the runtime of the computer system in response to a change in charge capacity or charge level of a battery of the computer system.

13. The non-transitory computer readable storage medium of claim 8 wherein the restoring comprises:
intercepting a memory access request directed to a particular portion of the saved data; and
in response to the intercepting, restoring the particular portion from the nonvolatile storage device to the persistent memory allocation.

14. The non-transitory computer readable storage medium of claim 8 wherein the method further comprises:
dynamically modifying the persistent memory allocation's size during runtime of the computer system.

15. A computer system comprising:
a battery;
a BIOS (Basic Input/Output System);
an operating system (OS) or hypervisor;
a volatile memory; and
a non-transitory computer readable medium having stored thereon program code for implementing OS or hypervisor based persistent memory, the program code causing the OS or hypervisor to:
allocate a portion of a memory space of the volatile memory as a persistent memory allocation;
receive a signal from the BIOS indicating an alternating current (AC) power loss or power cycle event;
in response to the signal, save data in the persistent memory allocation to a nonvolatile storage device; and
upon restoration of AC power to the computer system, restore the saved data from the nonvolatile storage device to the persistent memory allocation.

16. The computer system of claim 15 wherein the program code further causes the OS or hypervisor to, prior to receiving the signal:
track one or more memory pages in the persistent memory allocation that are written to or likely to be written to during runtime of the computer system; and
periodically flush dirty data in the one or more memory pages to the nonvolatile storage device while the computer system is running on AC power,
wherein the data saved in response to the signal corresponds to a part of the dirty data in the one or more memory pages that has not yet been flushed via the periodic flushing.

17. The computer system of claim 16 wherein the OS or hypervisor ensures that an amount of the data in the persistent memory allocation that has not been flushed to the nonvolatile storage device does not exceed a threshold.

18. The computer system of claim 17 wherein the threshold is dynamically increased or decreased during the runtime of the computer system in response to a change in write bandwidth of the nonvolatile storage device.

19. The computer system of claim 17 wherein the threshold is dynamically increased or decreased during the runtime of the computer system in response to a change in charge capacity or charge level of a battery of the computer system.

20. The computer system of claim 15 wherein the program code that causes the OS or hypervisor to restore the saved data comprises program code that causes the OS or hypervisor to:
   intercept a memory access request directed to a particular portion of the saved data; and
   in response to intercepting the memory access request, restore the particular portion from the nonvolatile storage device to the persistent memory allocation.

21. The computer system of claim 15 wherein the program code further causes the OS or hypervisor to:
   dynamically modify the persistent memory allocation's size during runtime of the computer system.

* * * * *